US012567811B2

(12) United States Patent
Lin et al.

(10) Patent No.: US 12,567,811 B2
(45) Date of Patent: Mar. 3, 2026

(54) RESONANT CONVERTER SWITCHING BETWEEN DIFFERENT OPERATIONAL STATE MODES

(71) Applicant: National Taiwan University of Science and Technology, Taipei City (TW)

(72) Inventors: Jing-Yuan Lin, New Taipei City (TW); Wei-Sheng Hsu, Keelung City (TW); Yi-Feng Lin, Yilan County (TW)

(73) Assignee: NATIONAL TAIWAN UNIVERSITY OF SCIENCE AND TECHNOLOGY, Taipei City (TW)

( * ) Notice: Subject to any disclaimer, the term of this patent is extended or adjusted under 35 U.S.C. 154(b) by 176 days.

(21) Appl. No.: 18/420,935

(22) Filed: Jan. 24, 2024

(65) Prior Publication Data

US 2025/0167688 A1 May 22, 2025

(30) Foreign Application Priority Data

Nov. 17, 2023 (TW) ................................. 112144400

(51) Int. Cl.
*H02M 3/335* (2006.01)
*H02M 1/00* (2006.01)
*H02M 1/38* (2007.01)

(52) U.S. Cl.
CPC ..... *H02M 3/33571* (2021.05); *H02M 1/0035* (2021.05); *H02M 1/385* (2021.05)

(58) Field of Classification Search
CPC . H02M 3/33571; H02M 1/385; H02M 1/0035
See application file for complete search history.

(56) References Cited

U.S. PATENT DOCUMENTS

| | | | |
|---|---|---|---|
| 8,416,597 B2* | 4/2013 | Adragna | H02M 3/33592 |
| | | | 363/21.02 |
| 9,281,752 B2* | 3/2016 | Fu | H02M 3/33576 |
| 10,186,948 B2* | 1/2019 | Moon | H02H 1/0007 |

(Continued)

FOREIGN PATENT DOCUMENTS

| | | |
|---|---|---|
| EP | 4057491 A1 | 9/2022 |
| TW | M312840 U | 5/2007 |

(Continued)

*Primary Examiner* — Adolf D Berhane
(74) *Attorney, Agent, or Firm* — Li & Cai Intellectual Property (USA) Office

(57) ABSTRACT

A resonant converter switching between different operational state modes is provided. The resonant converter includes a first transistor, a second transistor, a control circuit, a resonant circuit, a transformer and an output stage circuit. A first terminal of the first transistor and a second terminal of the second transistor are connected to positive and negative terminals of an input voltage source, respectively. A first terminal of the second transistor is connected to a second terminal of the first transistor. The resonant circuit is connected to the second terminal of the first transistor and the transformer. The transformer is connected to a load through the output stage circuit. The control circuit modulates frequencies or duty cycles of conduction time control signals that are outputted to the first and second transistors to different values for switching the resonant converter between the operational state modes.

6 Claims, 9 Drawing Sheets

(56)                    References Cited

U.S. PATENT DOCUMENTS

| 11,757,365 B2 * | 9/2023 | Jaksa | ................. | H02M 1/0058 |
| | | | | 363/21.06 |
| 11,799,380 B2 * | 10/2023 | Moon | .................... | H02M 3/01 |
| 11,817,791 B2 * | 11/2023 | Iorio | ................ | H02M 3/33592 |
| 2021/0152095 A1 | 5/2021 | Lin et al. | | |
| 2023/0155511 A1 | 5/2023 | Lin et al. | | |
| 2025/0141347 A1 * | 5/2025 | Lin | ........................ | H02M 3/01 |

FOREIGN PATENT DOCUMENTS

| TW | I410031 B | 9/2013 |
| TW | I439036 B | 5/2014 |
| TW | 202121811 A | 6/2021 |
| TW | I780983 B | 10/2022 |
| WO | WO2022188405 A1 | 9/2022 |
| WO | WO2023020051 A1 | 2/2023 |

* cited by examiner

RESONANT CONVERTER SWITCHING BETWEEN DIFFERENT OPERATIONAL STATE MODES

CROSS-REFERENCE TO RELATED PATENT APPLICATION

This application claims the benefit of priority to Taiwan Patent Application No. 112144400, filed on Nov. 17, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a resonant converter, and more particularly to a resonant converter switching between different operational state modes.

BACKGROUND OF THE DISCLOSURE

A standard battery charging DC voltage range of a vehicle system is 50V to 1000V. A synchronous rectification architecture is disposed on a primary-side and a secondary-side of a transformer inside a conventional capacitor-inductor-inductor-capacitor (CLLC) resonant converter. The synchronous rectification architecture of the conventional CLLC resonant converter includes a plurality of switch components. Switching frequencies of the switch components of the conventional CLLC resonant converter are modulated for adjusting a gain of an output voltage of the conventional CLLC resonant converter. However, the conventional CLLC resonant converter has unavoidable disadvantages. For example, in order to realize a wide output voltage range and a high voltage gain of the conventional CLLC resonant converter, the switching frequency of the switch components of the conventional CLLC resonant converter needs to be significantly changed, such that a difference between a resonant frequency and the switching frequency of the conventional CLLC resonant converter is increased. As a result, a decoupling time interval of the transformer of the conventional CLLC resonant converter is increased, which causes an increase in a circulating current flowing through the switch components on the primary-side of the conventional CLLC resonant converter. When the switch components of the conventional CLLC resonant converter are turned on, loss occurs for energy of resonant components of the conventional CLLC resonant converter, such that an efficiency of the conventional CLLC resonant converter is affected.

SUMMARY OF THE DISCLOSURE

In response to the above-referenced technical inadequacies, the present disclosure provides a resonant converter switching between different operational state modes. The resonant converter includes a first transistor, a second transistor, a control circuit, a resonant capacitor, a resonant inductor, a magnetizing inductor, a magnetizing inductor, a transformer and an output stage circuit. A first terminal of the first transistor is connected to a positive terminal of an input power source. A first terminal of the second transistor is connected to a second terminal of the first transistor. A second terminal of the second transistor is connected to a negative terminal of the input power source. A first terminal of the control circuit is connected to a control terminal of the first transistor and a control terminal of the second transistor. A first terminal of the resonant capacitor is connected to a node between the first terminal of the second transistor and the second terminal of the first transistor. A first terminal of the resonant inductor is connected to a second terminal of the resonant capacitor. A first terminal of the magnetizing inductor is connected to a second terminal of the resonant inductor. A second terminal of the magnetizing inductor is connected to the second terminal of the second transistor and the negative terminal of the input power source. An upper terminal of a primary side of the transformer is connected to the first terminal of the magnetizing inductor. A lower terminal of the primary side of the transformer is connected to the second terminal of the magnetizing inductor. An input terminal of the output stage circuit is connected to a secondary side of the transformer. An output terminal of the output stage circuit is connected to a load. The control circuit modulates frequencies or duty cycles of both of a first conduction time controlling signal and a second conduction time controlling signal to different values, the control circuit outputs the first conduction time controlling signal that is modulated to the control terminal of the first transistor, and the control circuit outputs the second conduction time controlling signal that is modulated to the control terminal of the second transistor, such that the resonant converter is switched between a plurality of operational state modes.

As described above, the present disclosure provides the resonant converter switching between the different operational state modes. The plurality of operational state modes to which the resonant converter of the present disclosure is switched not only includes the frequency modulation control mode, but also includes the asymmetric half-bridge control mode and the burst control mode. Therefore, a high operation efficiency of the resonant converter of the present disclosure is realized, and an output voltage of the resonant converter of the present disclosure is changed within a wide output voltage range.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
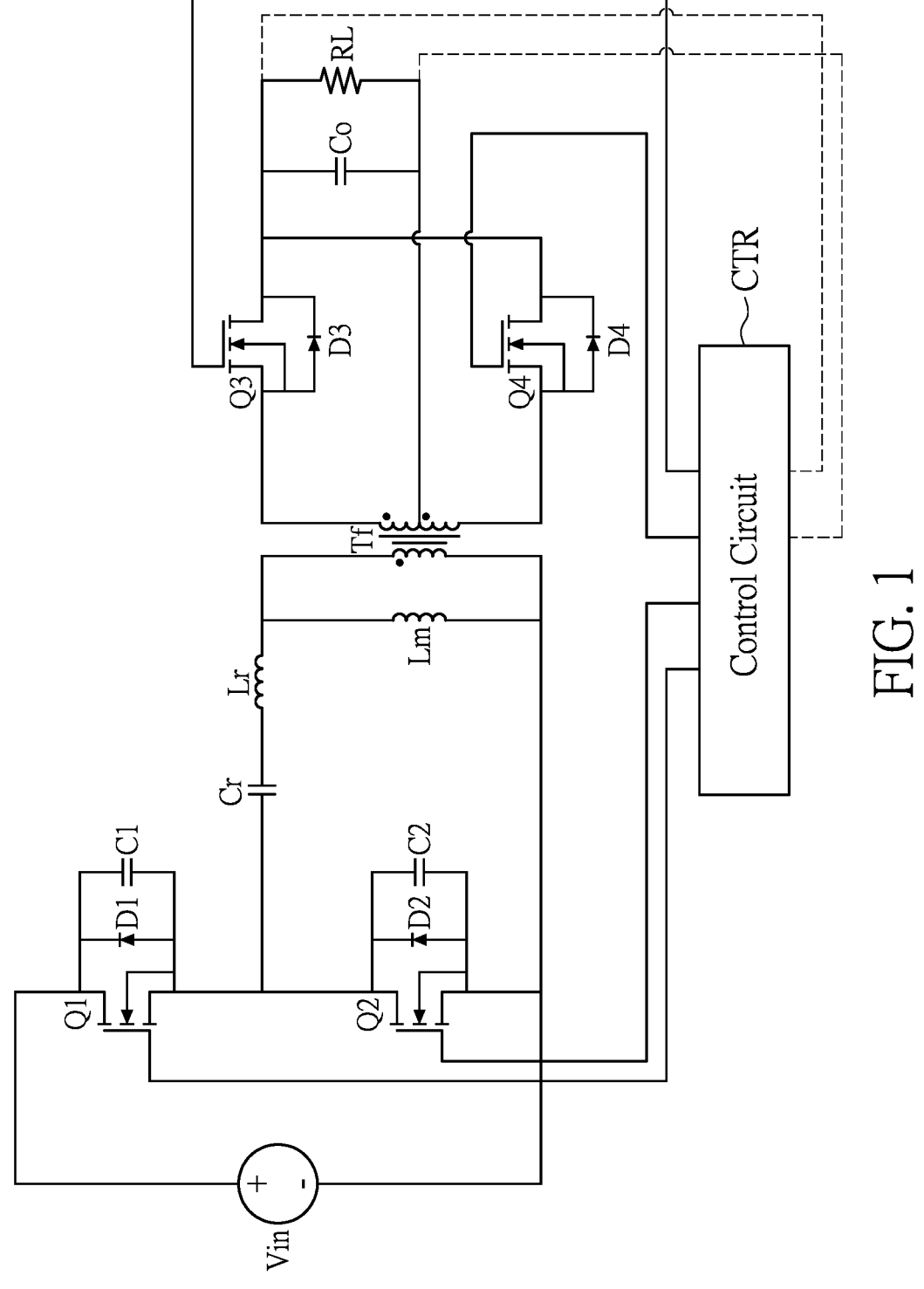
FIG. 1 is a circuit diagram of a resonant converter switching between different operational state modes according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a resonant converter switching between different operational state modes according to an embodiment of the present disclosure.

The resonant converter of the present disclosure includes a first transistor Q1, a second transistor Q2, a control circuit CTR, a resonant capacitor Cr, a resonant inductor Lr, a magnetizing inductor Lm and a transformer Tf as shown in FIG. 1.

In addition, the resonant converter of the present disclosure may further include an output stage circuit. As shown in FIG. 1, in the embodiment, the output stage circuit includes a third transistor Q3 and a fourth transistor Q4. In practice, the third transistor Q3 and the fourth transistor Q4 may be replaced with a high-side diode and a low-side diode.

A first terminal of the first transistor Q1 is connected to a positive terminal of an input power source Vin. A first terminal of the second transistor Q2 is connected to a second terminal of the first transistor Q1. A second terminal of the second transistor Q2 is connected to a negative terminal of the input power source Vin. A control terminal of the first transistor Q1 and a control terminal of the second transistor Q2 are connected to an output terminal of the control circuit CTR.

A first terminal of the resonant capacitor Cr is connected to a node between the first terminal of the second transistor Q2 and the second terminal of the first transistor Q1. A second terminal of the resonant capacitor Cr is connected to a first terminal of the resonant inductor Lr. A second terminal of the resonant inductor Lr is connected to a first terminal of the magnetizing inductor Lm. A second terminal of the magnetizing inductor Lm is connected to the second terminal of the second transistor Q2 and the negative terminal of the input power source Vin.

An upper terminal of a primary side of the transformer Tf is connected to the first terminal of the magnetizing inductor Lm and the second terminal of the resonant inductor Lr. A lower terminal of the primary side of the transformer Tf is connected to the second terminal of the magnetizing inductor Lm, the second terminal of the second transistor Q2 and the negative terminal of the input power source Vin.

If the output stage circuit includes the third transistor Q3 as shown in FIG. 1, a first terminal of the third transistor Q3 (that is one of a plurality of input terminals of the output stage circuit) is connected to an upper terminal of a secondary side of the transformer Tf, a second terminal of the third transistor Q3 (that is one of a plurality of output terminals of the output stage circuit) is connected to a first terminal of a load RL, and a second terminal of the load RL is connected to a center tap of the transformer Tf.

If the output stage circuit further includes the fourth transistor Q4 as shown in FIG. 1, a first terminal of the fourth transistor Q4 (that is another of the plurality of input terminals of the output stage circuit) is connected to a lower terminal of the secondary side of the transformer Tf, and a second terminal of the fourth transistor Q4 (that is another of the plurality of output terminals of the output stage circuit) is connected to the first terminal of the load RL.

If necessary, the output stage circuit may further include an output capacitor Co. A first terminal of the output capacitor Co is connected to the second terminal of the third transistor Q3, the second terminal of the fourth transistor Q4 and the first terminal of the load RL. A second terminal of the output capacitor Co is connected to the center tap of the transformer Tf. The output capacitor Co is connected in parallel to the load RL.

In practice, the output stage circuit may include the high-side diode and the low-side diode instead of the third transistor Q3 and the fourth transistor Q4. Under this condition, an anode of the high-side diode is connected to the upper terminal of the secondary side of the transformer Tf, a cathode of the high-side diode is connected to the first terminal of the load RL, the second terminal of the load RL is connected to the center tap of the transformer Tf, an anode of the low-side diode is connected to the lower terminal of the secondary side of the transformer Tf, and a cathode of the low-side diode is connected to the first terminal of the load RL. In addition, the first terminal of the output capacitor Co is connected to the cathode of the high-side diode, the cathode of the low-side diode and the first terminal of the load RL. A second terminal of the output capacitor Co is connected to the center tap of the transformer Tf and the second terminal of the load RL.

The control circuit CTR may be connected to the control terminal of the first transistor Q1, the control terminal of the second transistor Q2, a control terminal of the third transistor Q3 and a control terminal of the fourth transistor Q4.

The control circuit CTR modulates a frequency or a duty cycle of a first conduction time controlling signal respectively to different values (according to a voltage or a current of the load RL), and outputs the modulated first conduction time controlling signal to the control terminal of the first transistor Q1. The control circuit CTR modulates a frequency or a duty cycle of a second conduction time controlling signal respectively to different values, and outputs the modulated first conduction time controlling signal to the control terminal of the second transistor Q2. Therefore, the resonant converter of the present disclosure is switched between the plurality of operational state modes.

When the control circuit CTR modulates the frequency of the first conduction time controlling signal to reach a frequency threshold, the control circuit CTR maintains the frequency of the first conduction time controlling signal to be equal to the frequency threshold, and subsequently modulates the duty cycle of the first conduction time controlling signal.

When the control circuit CTR modulates the frequency of the second conduction time controlling signal to reach the frequency threshold, the control circuit CTR maintains the frequency of the second conduction time controlling signal to be equal to the frequency threshold, and subsequently modulates the duty cycle of the second conduction time controlling signal.

For example, the plurality of operational state modes of the resonant converter of the present disclosure may include a frequency modulation control mode, an asymmetric half-bridge control mode and a burst control mode.

In the frequency modulation control mode, the control circuit CTR modulates the frequency of the first conduction time controlling signal and the frequency of the second conduction time controlling signal.

When the frequency of the first conduction time controlling signal reaches the frequency threshold and/or the frequency of the second conduction time controlling signal reaches the frequency threshold, the resonant converter of the present disclosure is switched from the frequency modulation control mode to the asymmetric half-bridge control mode.

In the asymmetric half-bridge control mode, the control circuit CTR modulates the duty cycle of the first conduction time controlling signal and the duty cycle of the second conduction time controlling signal.

When the duty cycle of the first conduction time controlling signal reaches the duty threshold and/or the duty cycle of the second conduction time controlling signal reaches the duty threshold, the resonant converter of the present disclo-sure is switched from the asymmetric half-bridge control mode to the burst control mode.

In the burst control mode, the control circuit CTR divides a conduction control time interval into a first frequency switching time interval and a second frequency switching time interval. Within the first frequency switching time interval, the control circuit CTR switches the first transistor and the second transistor at a first switching frequency (such as a high frequency). Within the second frequency switching time interval, the control circuit CTR switches the first transistor and the second transistor at a second switching frequency (such as a low frequency). The second switching frequency is smaller than the first switching frequency.

Figure 2:
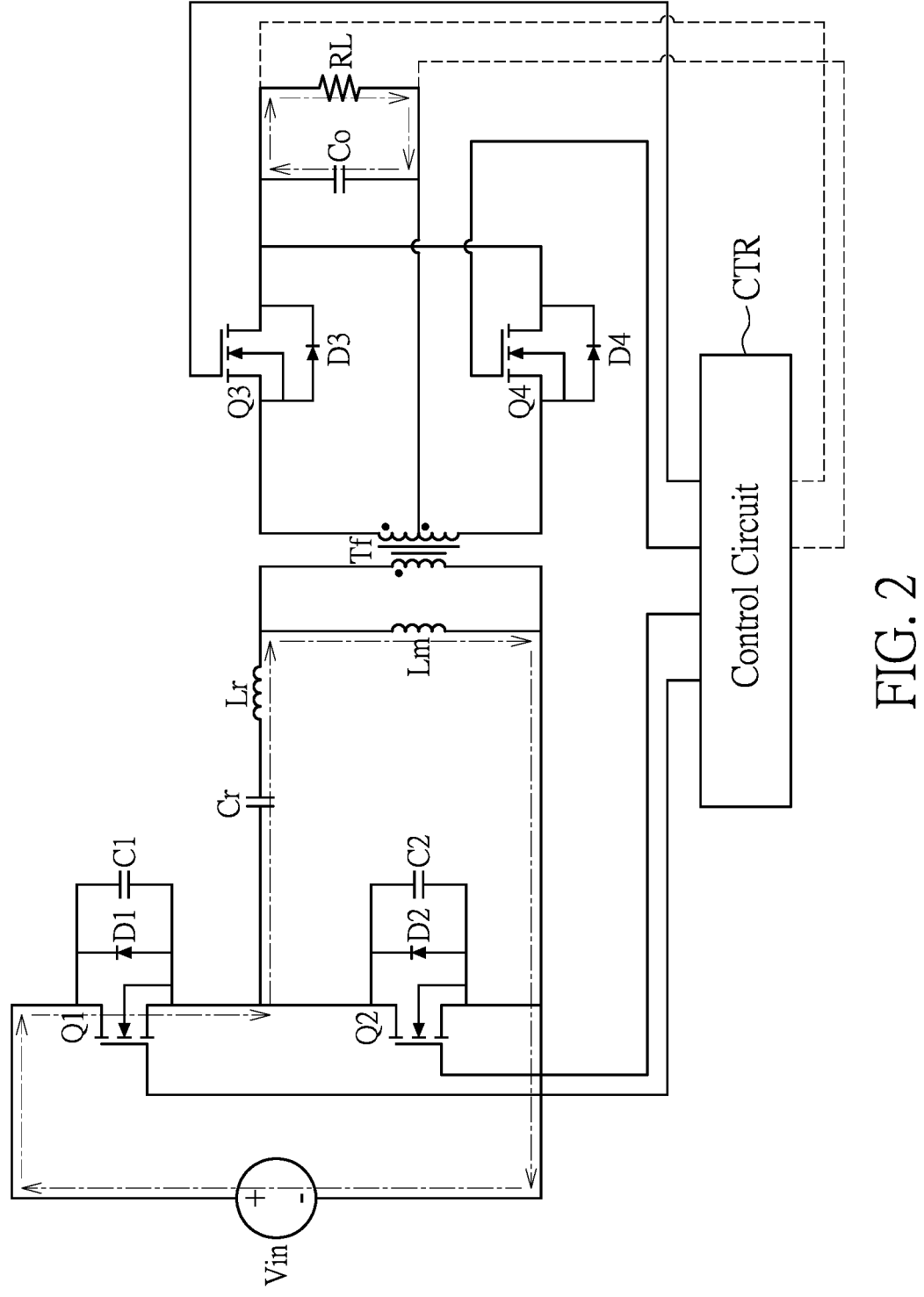
FIG. 2 is a schematic diagram of flow directions of currents of the resonant converter operating within a decoupling time interval according to the embodiment of the present disclosure.
Figure 3:
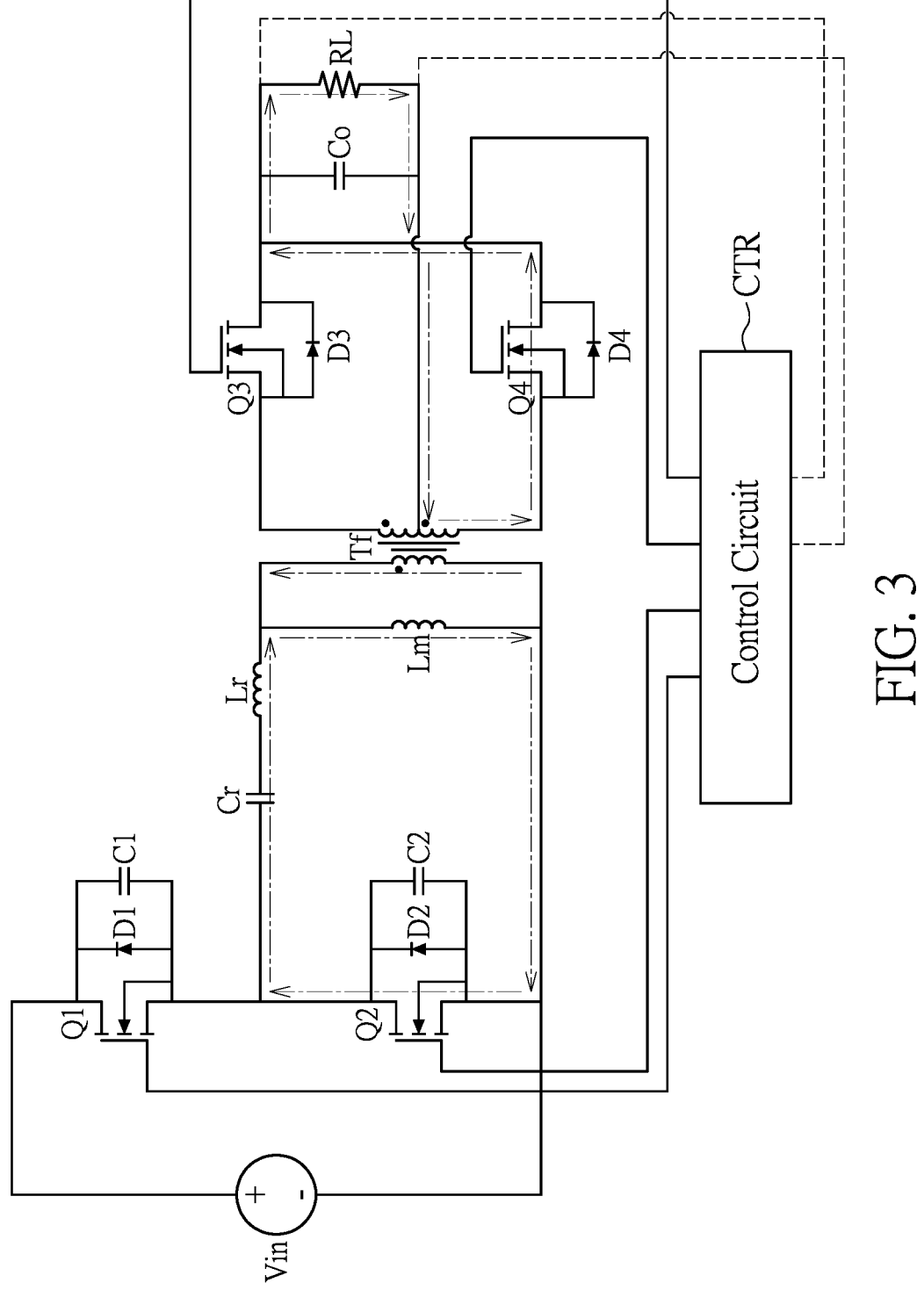
FIG. 3 is a schematic diagram of flow directions of currents of the resonant converter operating within a coupling time interval according to the embodiment of the present disclosure.

Reference is made to FIG. 1 to FIG. 3, in which FIG. 2 is a schematic diagram of flow directions of currents of the resonant converter operating within a decoupling time inter-val according to the embodiment of the present disclosure, and FIG. 3 is a schematic diagram of flow directions of currents of the resonant converter operating within a cou-pling time interval according to the embodiment of the present disclosure.

A working time interval of the resonant converter of the present disclosure mainly includes a decoupling time inter-val and a coupling time interval.

Within the decoupling time interval, the first transistor Q1 is turned on and the second transistor Q2 is turned off. Under this condition, as shown in FIG. 2, in a primary-side circuit of the transformer Tf, a current flows from the input power source Vin sequentially through the first transistor Q1 being turned on, the resonant capacitor Cr and the resonant induc-tor Lr to the magnetizing inductor Lm for storing energy in the magnetizing inductor Lm. At this time, the energy is not transmitted to the load RL yet, and thus only a discharging current of the output capacitor Co flows to the load RL for supplying energy to the load RL.

As shown in FIG. 3, within the coupling time interval, the first transistor Q1 is turned off and the second transistor Q2 is turned on. At this time, a current flows from the magne-tizing inductor Lm sequentially through windings of the transformer Tf and the third transistor Q3 (that may be replaced with the high-side diode in practice) to the load RL.

Figure 6:
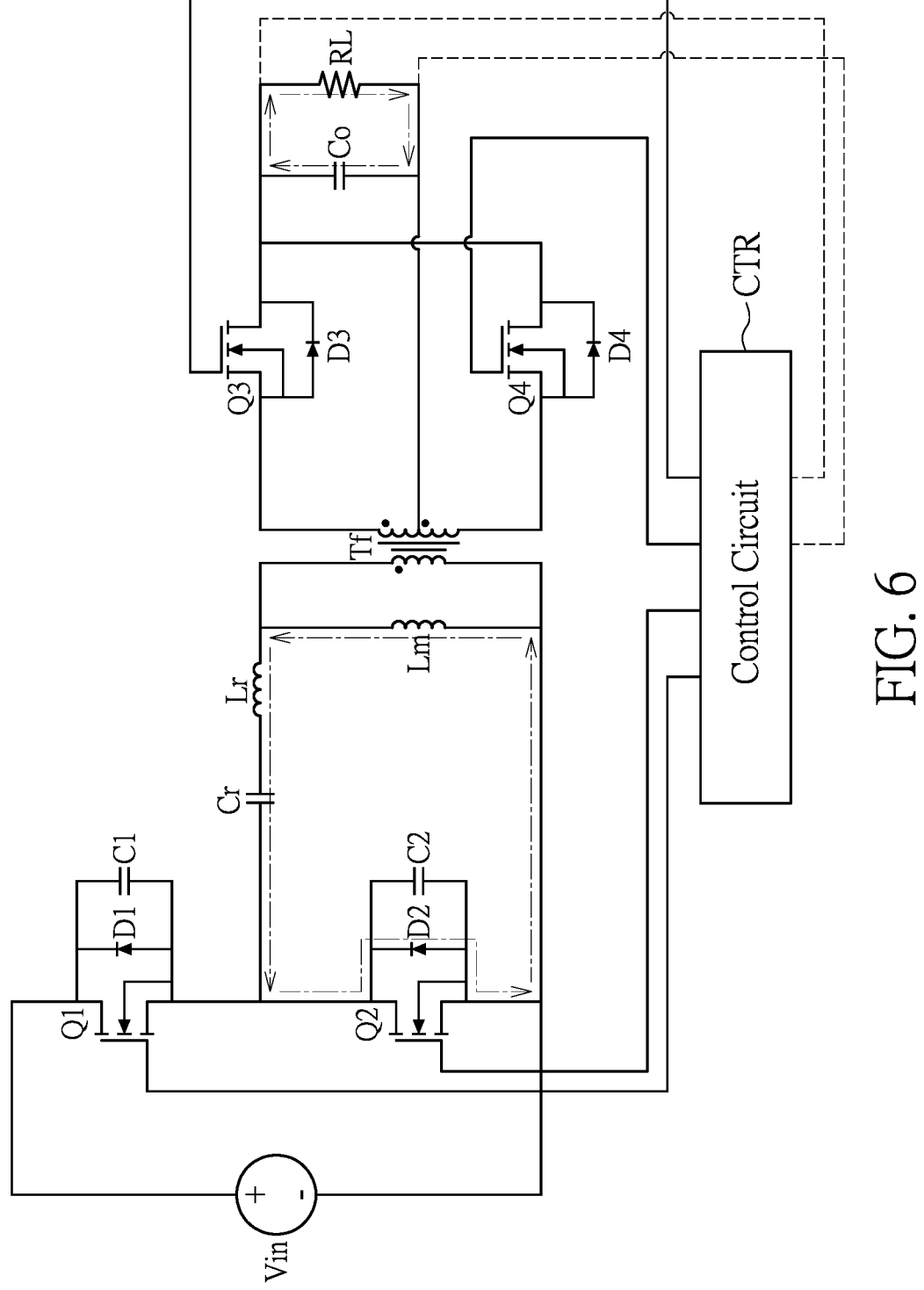
FIG. 6 is a schematic diagram of flow directions of currents of the resonant converter operating in the asymmetric half-bridge control mode according to the embodiment of the present disclosure.
Figure 7:
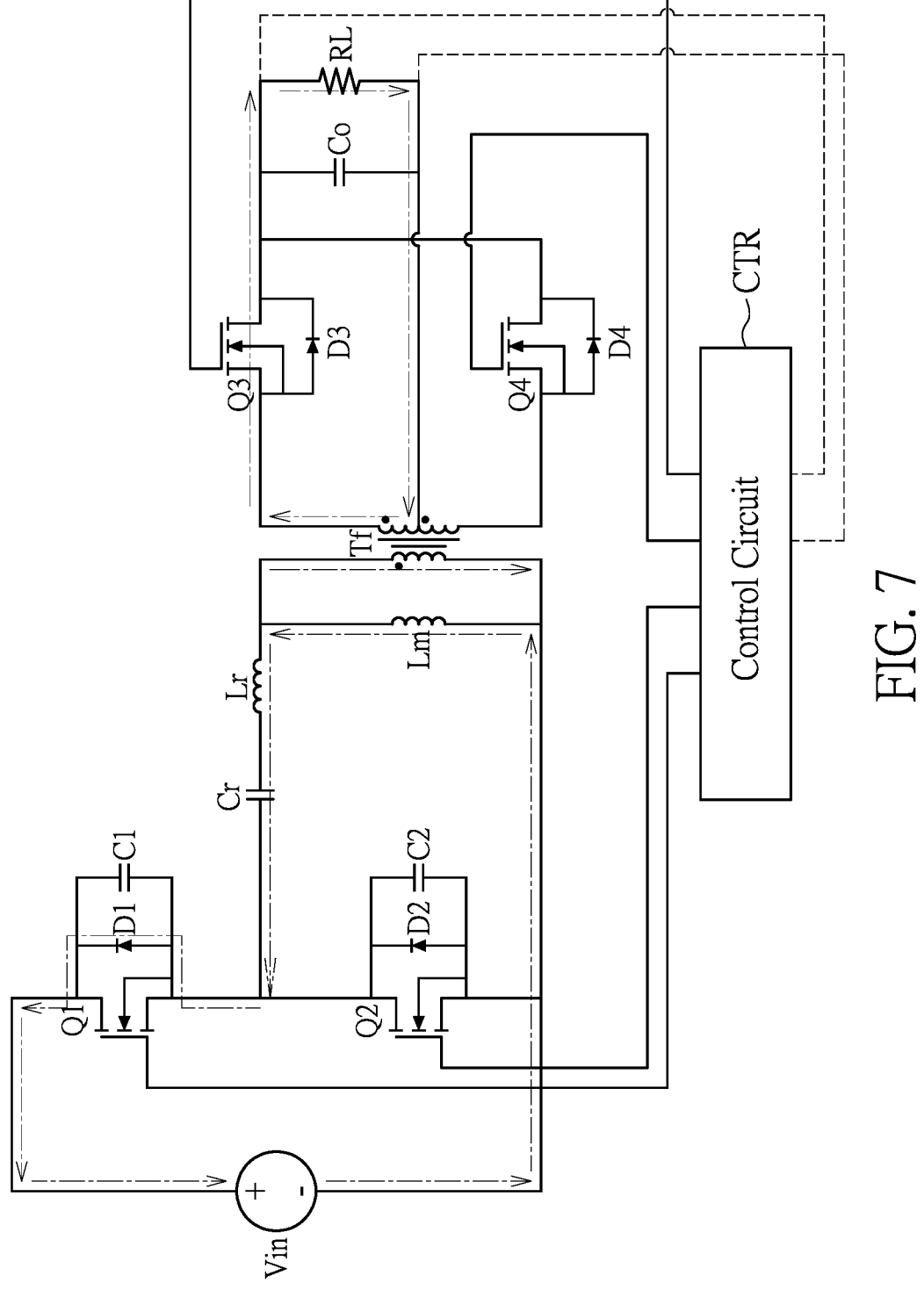
FIG. 7 is a schematic diagram of flow directions of currents of the resonant converter operating in the asymmetric half-bridge control mode according to the embodiment of the present disclosure.
Figure 8:
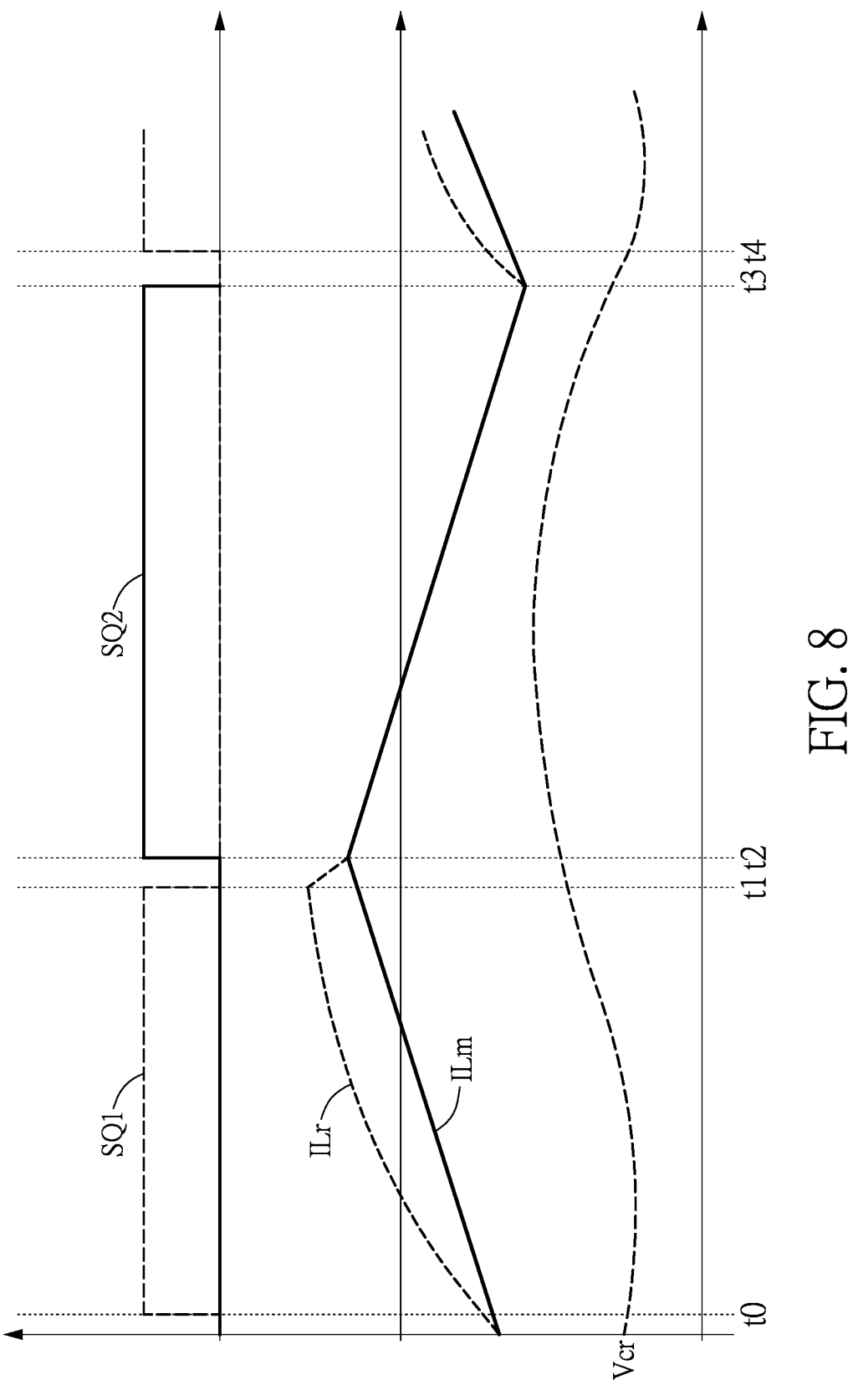
FIG. 8 is a waveform diagram of signals of the resonant converter operating in the asymmetric half-bridge control mode according to the embodiment of the present disclosure.

Reference is made to FIG. 1 and FIG. 4 to FIG. 8, in which FIG. 4 to FIG. 7 are schematic diagrams of flow directions of currents of the resonant converter operating in an asymmetric half-bridge control mode according to the embodiment of the present disclosure, and FIG. 8 is a waveform diagram of signals of the resonant converter operating in the asymmetric half-bridge control mode according to the embodiment of the present disclosure.

As shown in FIG. 1, the primary-side circuit of the transformer Tf of the resonant converter of the present disclosure includes the first transistor Q1, the second tran-sistor Q2, the control circuit CTR, the resonant capacitor Cr, the resonant inductor Lr and the magnetizing inductor Lm. A secondary-side circuit of the transformer Tf of the reso-nant converter of the present disclosure includes the third transistor Q3 and the fourth transistor Q4 (that may be replaced with the high-side diode and the low-side diode in practice), and further includes the output capacitor Co.

The resonant converter of the present disclosure may be switched to the asymmetric half-bridge control mode. In the asymmetric half-bridge control mode, the resonant converter of the present disclosure may operate within a plurality of working time intervals such as, but not limited to a first working time interval between an initial time point to and a first time point t1, a second working time interval (that is a dead time) between the first time point t1 and a second time point t2, a third working time interval between the second time point t2 and a third time point t3, and a fourth working time interval (that is a dead time) between the third time point t3 and a fourth time point t4 as shown in FIG. 8.

Figure 4:
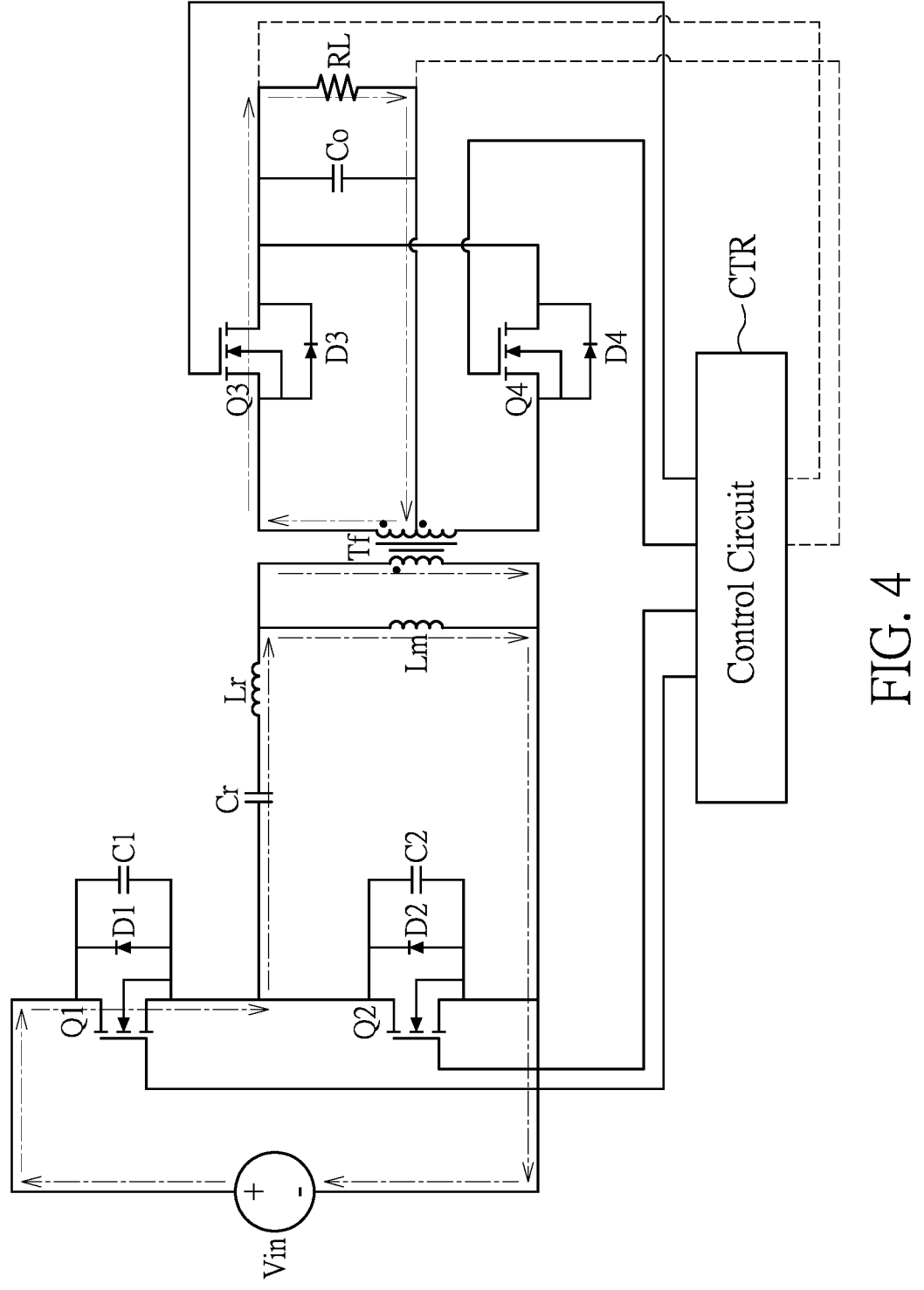
FIG. 4 is a schematic diagram of flow directions of currents of the resonant converter operating in an asymmetric half-bridge control mode according to the embodiment of the present disclosure.

Within the first working time interval between the initial time point to and the first time point t1 as shown in FIG. 8, the control circuit CTR outputs a first conduction time controlling signal SQ1 at a high level as shown in FIG. 8 to the control terminal of the first transistor Q1 for turning on the first transistor Q1 as shown in FIG. 4. At the same time, the control circuit CTR outputs a second conduction time controlling signal SQ2 at a low level as shown in FIG. 8 to the control terminal of the second transistor Q2 for turning off the second transistor Q2 as shown in FIG. 4.

Within the first working time interval between the initial time point to and the first time point t1 as shown in FIG. 8, a current flows from the input power source Vin sequentially through the first transistor Q1, the resonant capacitor Cr and the resonant inductor Lr to the magnetizing inductor Lm in the primary-side circuit of the transformer Tf as shown in FIG. 4. A voltage of the magnetizing inductor Lm is clamped to a voltage value that is represented by nVo as follows, wherein Vo represents an output voltage of the resonant converter of the present disclosure (that is a voltage of the output capacitor Co). A current ILm of the magnetizing inductor Lm rises slowly and a rising slope of the current ILm of the magnetizing inductor Lm is calculated by the following equation: n Vo/Lm. A current ILr of the resonant inductor Lr is larger than the current ILm of the magnetizing inductor Lm.

When the first transistor Q1 is switched from an on-state to an off-state, the resonant converter of the present disclosure enters the second working time interval from the first working time interval.

Figure 5:
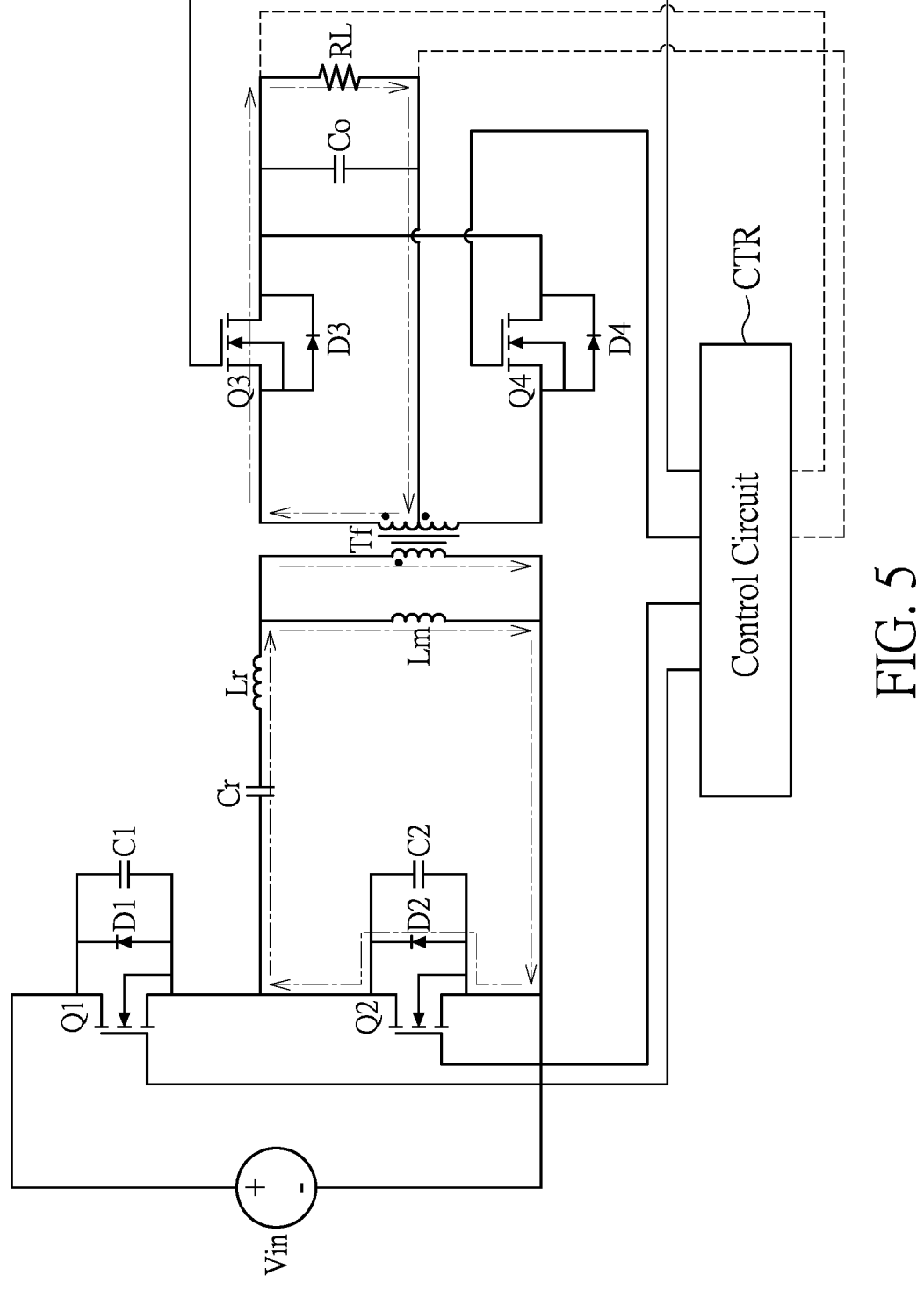
FIG. 5 is a schematic diagram of flow directions of currents of the resonant converter operating in the asymmetric half-bridge control mode according to the embodiment of the present disclosure.

Within the second working time interval (that is the dead time) between the first time point t1 and the second time point t2 as shown in FIG. 8, the control circuit CTR outputs the first conduction time controlling signal SQ1 at a low level as shown in FIG. 8 to the control terminal of the first transistor Q1 for turning off the first transistor Q1 as shown in FIG. 5. At the same time, the control circuit CTR outputs the second conduction time controlling signal SQ2 at the low level as shown in FIG. 8 to the control terminal of the second transistor Q2 for turning off the second transistor Q2 as shown in FIG. 5.

The current ILr of the resonant inductor Lr continually flows in the primary-side circuit. After a parasitic capacitance C2 of the second transistor Q2 is discharged, the current ILr of the resonant inductor Lr flows through a body diode D2 of the second transistor Q2 in the primary-side circuit as shown in FIG. 5. At this time, the transformer Tf remains in a coupling state and thus the energy is transmitted from the primary-side circuit through the transformer Tf to the secondary-side circuit, and then the energy is transmitted from the secondary side circuit to the load RL.

As shown in FIG. 8, within the second working time interval (that is the dead time) between the first time point t1 and the second time point t2, the current ILm of the magnetizing inductor Lm continually rises and the current ILr of the resonant inductor Lr falls rapidly.

When the current ILr of the resonant inductor Lr is equal to the current ILm of the magnetizing inductor Lm and the second transistor Q2 is turned on, the resonant converter of the present disclosure enters the third working time interval from the second working time interval.

Within the third working time interval between the second time point t2 and the third time point t3 as shown in FIG. 8, the control circuit CTR outputs the first conduction time controlling signal SQ1 at the low level as shown in FIG. 8 to the control terminal of the first transistor Q1 for turning off the first transistor Q1 as shown in FIG. 6. At the same time, the control circuit CTR outputs the second conduction time controlling signal SQ2 at a high level as shown in FIG. 8 to the control terminal of the second transistor Q2 for turning on the second transistor Q2 as shown in FIG. 6.

Within the third working time interval between the second time point t2 and the third time point t3 as shown in FIG. 8, the resonant capacitor Cr, resonant inductor Lr and magnetizing inductor Lm in the primary circuit resonate together, and a voltage Ver of the resonant capacitor Cr changes as shown in FIG. 8.

Within the third working time interval between the second time point t2 and the third time point t3 as shown in FIG. 8, the transformer Tf is in a decoupling state. Under this condition, the energy is not transmitted from the primary-side circuit sequentially through the transformer Tf and the secondary-side circuit to the load RL. Therefore, only the discharging current of the output capacitor Co flows to the load RL for supplying energy to the load RL.

When the second transistor Q2 is switched from an on-state to an off-state, the resonant converter of the present disclosure enters the fourth working time interval from the third working time interval.

Within the fourth working time interval (that is the dead time) between the third time point t3 and the fourth time point t4 as shown in FIG. 8, the control circuit CTR outputs the first conduction time controlling signal SQ1 at the low level as shown in FIG. 8 to the control terminal of the first transistor Q1 for turning off the first transistor Q1 as shown in FIG. 7. At the same time, the control circuit CTR outputs the second conduction time controlling signal SQ2 at the low level as shown in FIG. 8 to the control terminal of the second transistor Q2 for turning off the second transistor Q2 as shown in FIG. 7.

Within the fourth working time interval (that is the dead time) between the third time point t3 and the fourth time point t4 as shown in FIG. 8, the current ILm of the magnetizing inductor Lm is divided into two currents, wherein one of the two currents continually flows from the magnetizing inductor Lm to a body diode D1 of the first transistor Q1, and the other of the two currents flows to the windings of the transformer Tf in the coupling state. The energy is transmitted from the primary-side circuit through the transformer Tf to the secondary-side circuit, and then the energy is transmitted from the secondary-side circuit to the load RL.

The resonant converter of the present disclosure may perform the above-mentioned operations within the first to fourth working time intervals for multiple times.

Figure 9:
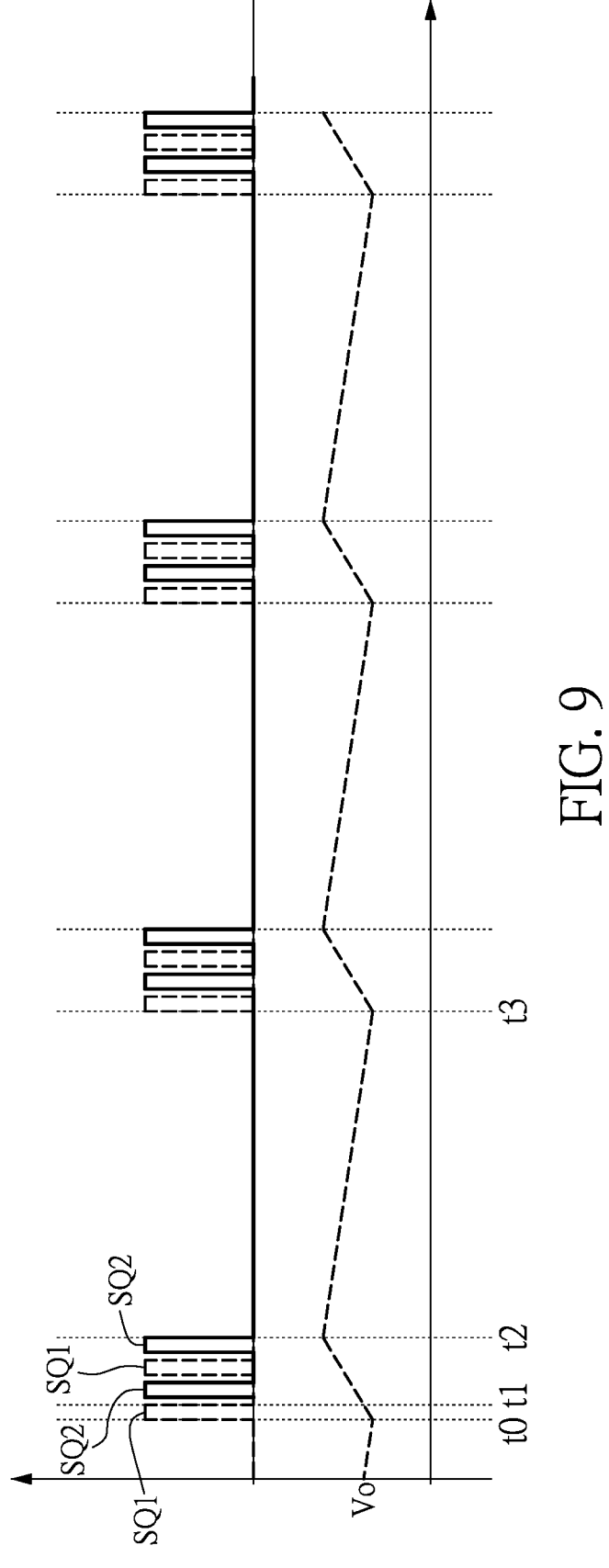
FIG. 9 is a waveform diagram of signals of the resonant converter operating in a burst control mode according to the embodiment of the present disclosure.

Reference is made to FIG. 1 and FIG. 9, in which FIG. 9 is a waveform diagram of signals of the resonant converter operating in a burst control mode according to the embodiment of the present disclosure.

The resonant converter of the present disclosure may be switched to the burst control mode.

In the burst control mode, the control circuit CTR may divide each of a plurality of conduction control time intervals/cycles (such as a conduction control time interval between the time point to and the time point t3 as shown in FIG. 9) into a plurality of frequency switching time intervals including the first frequency switching time interval and the second frequency switching time interval.

In the burst control mode, within the first frequency switching time interval, the control circuit CTR quickly and alternately outputs a plurality of waveforms of the first conduction time controlling signal SQ1 and a plurality of waveforms of the second conduction time controlling signal SQ2 for quickly and alternately switching the first transistor Q1 and the second transistor Q2 at the first switching frequency (that is the high frequency).

In the burst control mode, within the second frequency switching time interval, the control circuit CTR slowly and alternately outputs the plurality of waveforms of the first conduction time controlling signal SQ1 and the plurality of waveforms of the second conduction time controlling signal SQ2 for slowly and alternately switching the first transistor Q1 and the second transistor Q2 at the second switching frequency (that is the low frequency). The second switching frequency is smaller than the first switching frequency.

That is, in the burst control mode, the control circuit CTR may switch the first transistor Q1 and the second transistor Q2 at the high frequency within the first frequency switching time interval, but switch the first transistor Q1 and the second transistor Q2 at the low frequency within the second frequency switching time interval. After switching the first transistor Q1 and the second transistor Q2 at the low frequency for a period of time, the control circuit CTR switches the first transistor Q1 and the second transistor Q2 at the high frequency.

A non-working period of the first conduction time controlling signal SQ1 includes a length of time falling within the second working time interval (that is the dead time) between the second time point t2 and the third time point t3. A non-working period of the second conduction time controlling signal SQ2 also includes a length of time falling within the second working time interval (that is the dead time) between the second time point t2 and the third time point t3. The non-working period of the first conduction time controlling signal SQ1 outputted to the control terminal of the first transistor Q1 and the non-working period of the second conduction time controlling signal SQ2 outputted to the control terminal of the second transistor Q2 longer lengths of time such that the first transistor Q1 and the second transistor Q2 are switched at the low frequency. Within the second working time interval (that is the dead time) between the second time point t2 and the third time point t3, the first transistor Q1 and the second transistor Q2 are turned off such that the output voltage Vo of the resonant converter of the present disclosure is gradually reduced.

In particular, when the resonant converter of the present disclosure is applied to the load RL being a light load that only needs low energy, the output voltage Vo of the resonant converter of the present disclosure may be reduced.

In conclusion, the present disclosure provides the resonant converter switching between the different operational state modes. The plurality of operational state modes to which the resonant converter of the present disclosure is switched not only includes the frequency modulation control mode, but also includes the asymmetric half-bridge control mode and the burst control mode. Therefore, a high operation efficiency of the resonant converter of the present disclosure is realized, and the output voltage of the resonant converter of the present disclosure is changed within a wide output voltage range.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A resonant converter switching between different operational state modes, comprising:

a first transistor, wherein a first terminal of the first transistor is connected to a positive terminal of an input power source;

a second transistor, wherein a first terminal of the second transistor is connected to a second terminal of the first transistor, and a second terminal of the second transistor is connected to a negative terminal of the input power source;

a control circuit, wherein a first terminal of the control circuit is connected to a control terminal of the first transistor and a control terminal of the second transistor;

a resonant capacitor, wherein a first terminal of the resonant capacitor is connected to a node between the first terminal of the second transistor and the second terminal of the first transistor;

a resonant inductor, wherein a first terminal of the resonant inductor is connected to a second terminal of the resonant capacitor;

a magnetizing inductor, wherein a first terminal of the magnetizing inductor is connected to a second terminal of the resonant inductor, and a second terminal of the magnetizing inductor is connected to the second terminal of the second transistor and the negative terminal of the input power source;

a transformer, wherein an upper terminal of a primary side of the transformer is connected to the first terminal of the magnetizing inductor, and a lower terminal of the primary side of the transformer is connected to the second terminal of the magnetizing inductor; and an output stage circuit, wherein an input terminal of the output stage circuit is connected to a secondary side of the transformer, and an output terminal of the output stage circuit is connected to a load;

wherein a primary-side circuit of the transformer is connected to the primary side of the transformer, and includes the first transistor, the second transistor, the resonant capacitor, the resonant inductor and the magnetizing inductor;

wherein a secondary-side circuit of the transformer is connected to the secondary side of the transformer, and includes the output stage circuit;

wherein the resonant converter is switched between a plurality of operational state modes, and the plurality of operational state modes includes a frequency modulation control mode and an asymmetric half-bridge control mode;

wherein, in the frequency modulation control mode, the control circuit modulates a frequency of a first conduction time controlling signal and a frequency of a second conduction time controlling signal to different values, the control circuit outputs the first conduction time controlling signal having the frequency that is modulated to the control terminal of the first transistor, and the control circuit outputs the second conduction time controlling signal having the frequency that is modulated to the control terminal of the second transistor;

wherein, when the frequency of the first conduction time controlling signal or the second conduction time controlling signal of the primary-side circuit reaches a frequency threshold, the resonant converter is switched from the frequency modulation control mode to the asymmetric half-bridge control mode;

wherein, in the asymmetric half-bridge control mode, the control circuit modulates a duty cycle of the first conduction time controlling signal and a duty cycle of the second conduction time controlling signal, outputs the first conduction time controlling signal having the duty cycle that is modulated to the control terminal of the first transistor, and outputs the second conduction time controlling signal having the duty cycle that is modulated to the control terminal of the second transistor.

2. The resonant converter according to claim 1, wherein the output stage circuit includes:

a third transistor, wherein a first terminal of the third transistor is connected to an upper terminal of the secondary side of the transformer and a first terminal of the load, and a second terminal of the load is connected to a center tap of the transformer; and a fourth transistor, wherein a first terminal of the fourth transistor is connected to a lower terminal of the secondary side of the transformer, and a second terminal of the fourth transistor is connected to the first terminal of the load.

3. The resonant converter according to claim 2, wherein the output stage circuit further includes:

an output capacitor, wherein a first terminal of the output capacitor is connected to a second terminal of the third transistor, a second terminal of the fourth transistor and the first terminal of the load, and a second terminal of the output capacitor is connected to the center tap of the transformer and a second terminal of the load.

4. The resonant converter according to claim 1, wherein the output stage circuit includes:

a high-side diode, wherein an anode of the high-side diode is connected to an upper terminal of the secondary side of the transformer and the first terminal of the load, and the second terminal of the load is connected to a center tap of the transformer; and a low-side diode, wherein an anode of the low-side diode is connected to a lower terminal of the secondary side of the transformer, and a cathode of the low-side diode is connected to the first terminal of the load.

5. The resonant converter according to claim 4, wherein the output stage circuit further includes:

an output capacitor, wherein a first terminal of the output capacitor is connected to a cathode of the high-side diode, the cathode of the low-side diode and to the first terminal of the load, and a second terminal of the output capacitor is connected to the center tap of the transformer and the second terminal of the load.

6. The resonant converter according to claim 1, wherein the plurality of operational state modes further includes a burst control mode;

wherein, in the burst control mode, the control circuit divides a conduction control time interval into a first frequency switching time interval and a second frequency switching time interval;

wherein, within the first frequency switching time interval, the control circuit switches the first transistor and the second transistor at a first switching frequency;

wherein, within the second frequency switching time interval, the control circuit switches the first transistor and the second transistor at a second switching frequency, and the second switching frequency is smaller than the first switching frequency.

* * * * *